No. 787,087. PATENTED APR. 11, 1905.
O. DUMAS.
SPINNING RING FRAME.
APPLICATION FILED OCT. 10, 1904.

WITNESSES:
Chas. H. Luther Jr.
Ada E. Hagerty

INVENTOR:
Oliver Dumas
by Joseph A. Miller & Co.
ATTORNEYS

No. 787,087. Patented April 11, 1905.

UNITED STATES PATENT OFFICE.

OLIVER DUMAS, OF FALL RIVER, MASSACHUSETTS.

SPINNING-RING FRAME.

SPECIFICATION forming part of Letters Patent No. 787,087, dated April 11, 1905.

Application filed October 10, 1904. Serial No. 227,863.

*To all whom it may concern:*

Be it known that I, OLIVER DUMAS, a citizen of the United States, residing at Fall River, in the county of Bristol and State of Massachusetts, have invented a new and useful Improvement in Spinning-Machines, of which the following is a specification.

This invention has reference to an improvement in spinning-machines, and more particularly to an improvement in means for oiling the lifter-rods of spinning or similar machines.

In spinning-frames or similar machines the lifter-rods are supported in bearings in the front rails of the machine and are reciprocated through the bearings by the lifter-arms, which in turn are operated by the builder motion to reciprocate the ring-rail by the lifter-rods in the usual way. As heretofore constructed the bearings for the lifter-rods were usually vertical holes in the front rails used without oil, thereby causing friction and requiring increased power to run the machine. If oil were inadvertently used in these bearings, lint from the machine would collect on the oiled rods, clog up the bearings, causing them to bind, and prevent the accurate reciprocating movement of the ring-rail.

The object of my invention is to provide means for properly oiling the bearings of the lifter-rods of spinning-frames or similar machines.

A further object of my invention is to improve the construction of the bearings for the lifter-rods of spinning-frames or similar machines, thereby preventing lint or other extraneous substances from entering the bearings.

My invention consists in the peculiar and novel construction of the bearings for the lifter-rods of spinning-frames or similar machines, an oil-well connecting the bearings, and adjustable cone-shaped caps on the bearings, whereby the bearings are kept properly oiled and free from lint or other foreign substances, as will be more fully set forth hereinafter.

Figure 1:
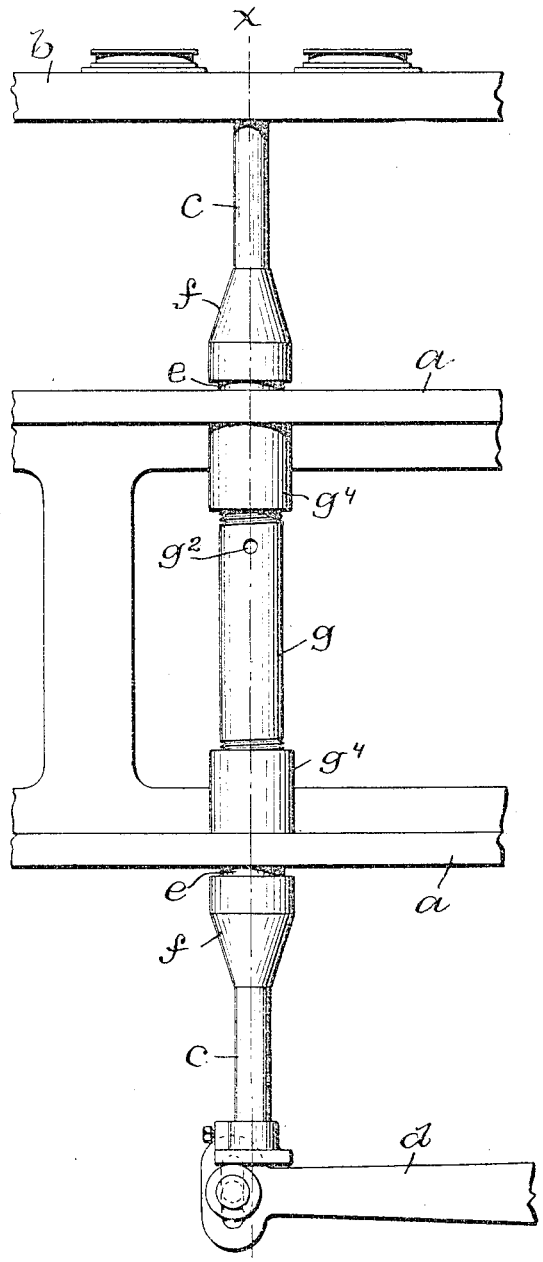
Figure 2:
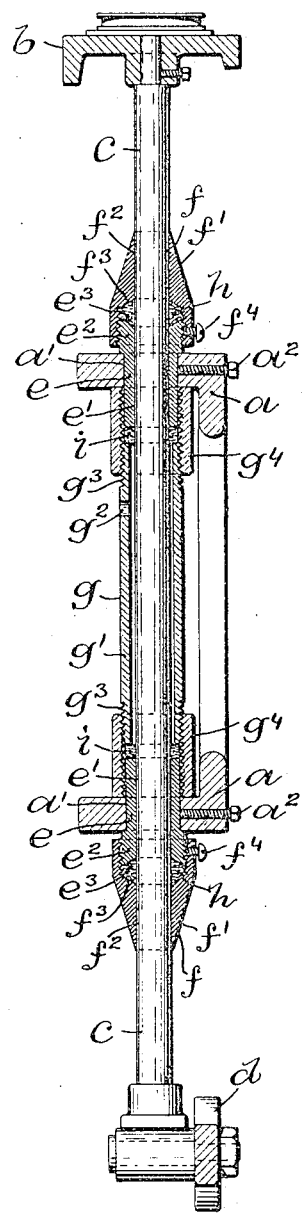

Figure 1 is a front view of part of a spinning-frame, showing a lifter-rod provided with my improved bearings and oiling device; and Fig. 2 is a vertical sectional view taken on line X X of Fig. 1, showing the construction of the bearings, the oil-well connecting the bearings, and the cone-shaped caps on the bearings.

In the drawings, $a\ a$ indicate the front rails, $b$ the ring-rail, $c$ a lifter-rod, and $d$ a lifter-arm, of a spinning-frame. The front rails $a\ a$ have the vertical holes $a'\ a'$ and the set-bolts $a^2\ a^2$, as shown in Fig. 2.

$e\ e$ indicate the bearings, $f\ f$ the cone-shaped lint-proof caps, $g$ the oil-well connecting the bearings, $h\ h$ the outer felt packing-rings, and $i\ i$ the inner felt oiling-rings, of my improved oiling device.

The bearings $e\ e$ each have the vertical bore $e'$ for the lifter-rod $c$ and the enlarged screw-threaded head $e^2$, in the end of which is the depression $e^3$ for the packing-ring $h$. The bearings extend through the holes $a'\ a'$ in the front rails, in which they are secured by the set-bolts $a^2\ a^2$, as shown in Fig. 2.

The caps $f\ f$ each have the cone-shaped top $f'$, in which is the hole $f^2$ for the lifter-rod $c$ and the inner surface $f^3$, bearing on the packing-ring $h$. The caps $f\ f$ are adjustably secured to the bearings by screwing them on the heads $e^2\ e^2$ and held in the adjusted position by the set-screws $f^4\ f^4$. The cone top of the caps extends outward from the bearings and closely fits the lifter-rod, forming a knife-edge for scraping off lint or other foreign substances which may collect on the rod.

The oil-well $g$ consists of a tube $g'$, surrounding the lifter-rod and having the oil-hole $g^2$ and the screw-threaded ends $g^3\ g^3$. The tube $g'$ is held in position between the front rails $a\ a$ by the screw-threaded sleeves $g^4\ g^4$, which are in screw-thread engagement with the ends $g^3\ g^3$ of the tube $g'$ and are supported in position by the inner ends of the bearings $e\ e$, which extend into them, as shown in Fig. 2.

The felt packing-rings $h\ h$ are each held between the depression $e^3$ in the bearings and the inner surface $f^3$ of the caps and prevent lint or other foreign substances from entering the bearings, and the felt oiling-rings $i\ i$ are each held between the inner ends of the bearings $e\ e$ and the ends of the tube $g'$.

In the operation of my improved oiling device for spinning-machines the lifter-rod $c$ and the bearings $e\ e$ are oiled by the reciprocating movement of the lifter-rod through the oil-well $g$, which is supplied with oil through the oil-hole $g^2$. The cone-shaped caps $f\ f$ prevent lint or other extraneous substances from entering the bearings by scraping off any lint or foreign substance which may have collected on the oiled lifter-rods outside of the bearings, and the caps $f\ f$ are adjusted by turning them on the bearings $e\ e$ to tighten the packing-rings $h\ h$ and secured in their adjusted position by the set-screws $f^4\ f^4$.

It is evident that the cone-shaped caps $f\ f$ may be constructed of sheet metal, if desired, and adjustably secured to the bearings $e\ e$ in any well-known way without materially affecting the spirit of my invention.

What I claim as my invention, and desire to secure by Letters Patent, is—

1. The combination with the front rails and lifter-rod of a spinning-machine, of bearings for the lifter-rod, means for securing the bearings in the front rails, cone-shaped caps on the bearings surrounding the lifter-rod, and means for adjustably securing the cap to the bearings, as described.

2. The combination with the front rails and lifter-rod of a spinning-machine, of bearings for the lifter-rod, means for securing the bearings in the front rails, cone-shaped caps surrounding the lifter-rod on the bearings, felt packing-rings intermediate the ends of the bearings and the inner surface of the caps, and means for adjustably securing the cap to the bearings, as described.

3. The combination with the front rails and lifter-rod of a spinning-machine, of bearings for the lifter-rod, means for securing the bearings in the front rails, a tube surrounding the lifter-rod forming an oil-well connecting the bearings, felt rings intermediate the ends of the tube and the bearings, cone-shaped caps surrounding the lifter-rod, felt packing-rings intermediate the ends of the bearings and the inner surface of the caps, and means for adjustably securing the caps to the bearings, as described.

4. The combination with the front rails and lifter-rod of a spinning-machine, of the bearings $e\ e$, the cone-shaped caps $f\ f$, the oil-well $g$ connecting the bearings $e\ e$, the sleeves $g^4\ g^4$, the felt packing-rings $h\ h$ intermediate the outer ends of the bearings and the inner surface of the caps, the felt rings $i\ i$ intermediate the oil-well $g$ and the inner ends of the bearings, means for adjustably securing the caps to the outer ends of the bearings, and means for securing the bearings in the front rails, as described.

In testimony whereof I have signed my name to this specification in the presence of two subscribing witnesses.

OLIVER DUMAS.

Witnesses:
 ADA E. HAGERTY,
 J. A. MILLER, Jr.